(12) United States Patent
Gentner et al.

(10) Patent No.: US 9,327,680 B2
(45) Date of Patent: May 3, 2016

(54) SEAT BELT RETRACTOR

(75) Inventors: Bernd Gentner, Ellwangen (DE);
Thomas Moedinger, Alfdorf (DE);
Oliver Gross, Durlangen (DE); Juergen Rink, Waldstetten (DE)

(73) Assignee: TRW Automotive GmbH (DE)

( * ) Notice: Subject to any disclaimer, the term of this patent is extended or adjusted under 35 U.S.C. 154(b) by 1151 days.

(21) Appl. No.: 13/201,932

(22) PCT Filed: Mar. 3, 2010

(86) PCT No.: PCT/EP2010/001303
§ 371 (c)(1),
(2), (4) Date: Sep. 13, 2011

(87) PCT Pub. No.: WO2010/102744
PCT Pub. Date: Sep. 16, 2010

(65) Prior Publication Data
US 2012/0104136 A1 May 3, 2012

(30) Foreign Application Priority Data

Mar. 11, 2009 (DE) .................. 10 2009 012 565

(51) Int. Cl.
*B65H 75/48* (2006.01)
*B60R 22/34* (2006.01)

(52) U.S. Cl.
CPC ................. *B60R 22/3413* (2013.01)

(58) Field of Classification Search
USPC .......... 242/376, 376.1, 379, 384, 384.2, 384.4
See application file for complete search history.

(56) References Cited

U.S. PATENT DOCUMENTS

| | | | |
|---|---|---|---|
| 4,811,912 A | 3/1989 | Takada | |
| 5,364,048 A | 11/1994 | Fujimura et al. | |
| 5,975,451 A * | 11/1999 | Kawamoto | 242/379.1 |
| 6,926,221 B2 * | 8/2005 | Rohrle et al. | 242/379.1 |
| 2003/0222452 A1 | 12/2003 | Rohrle et al. | |

FOREIGN PATENT DOCUMENTS

| | | |
|---|---|---|
| CN | 1100043 | 3/1995 |
| DE | 3809007 | 10/1988 |
| DE | 4311201 | 10/1993 |
| DE | 10321729 | 12/2003 |
| EP | 1619091 | 1/2006 |

* cited by examiner

*Primary Examiner* — William E Dondero
*Assistant Examiner* — Angela K Caligiuri
(74) *Attorney, Agent, or Firm* — Tarolli, Sundheim, Covell & Tummino LLP

(57) ABSTRACT

A seat belt retractor (10) comprises a frame (12), a belt reel (14) which is rotatably mounted in the frame (12), and a blocking pawl (22) which is provided at the belt reel (14) and is capable of engaging with a blocking teeth system (20). The blocking teeth system (20) is provided at a blocking ring (18) which is mounted at the frame (14) in a rotationally limited manner.

26 Claims, 8 Drawing Sheets

SEAT BELT RETRACTOR

RELATED APPLICATION

This application corresponds to PCT/EP2010/001303, filed Mar. 3, 2010, which claims the benefit of German Application No. 10 2009 012 565.5, filed Mar. 11, 2009, the subject matter of which is incorporated herein by references in its entirety.

FIELD OF THE INVENTION

The invention relates to a seat belt retractor comprising a frame, a reel rotatably mounted in the frame and a blocking pawl provided at the belt reel which is capable of engaging in a blocking teeth system.

BACKGROUND OF THE INVENTION

Seat belt retractors in vehicles include blocking means in order to stop a belt webbing extension in a case of restraint, for instance during impact or a strong deceleration of the vehicle, and thus to prevent the vehicle occupant from moving forward. For reducing the load by the belt webbing onto the vehicle occupant in the case of accident, force limiting means are provided which permit a defined belt webbing extension in the case of sufficiently high extending forces. The extension of the webbing is limited due to the restricted deformation behavior of the force limiter.

It is the object of the invention to provide a seat belt retractor which after locking the belt reel permits a defined belt webbing extension and an as small mounting size as possible.

SUMMARY OF THE INVENTION

In accordance with the invention, a seat belt retractor is provided comprising a frame, a belt reel rotatably mounted in the frame and a blocking pawl provided at the belt reel which is adapted to engage in a blocking teeth system. The blocking teeth system is provided in a blocking ring that is mounted to the frame to a rotatably limited extent. Upon activating the blocking pawl it is coupled to the blocking ring. Since the blocking ring is rotatable to a limited extent, after locking a defined belt webbing extension can take place until the belt reel is finally stopped upon reaching the end of the range of rotation. Any belt webbing extension can be varied by appropriately selecting the range of rotation.

In order to design the belt retractor in an as compact manner as possible, the blocking teeth system is preferably provided at the inside of the blocking ring and the blocking pawl is capable of radially outwardly engaging in the blocking teeth system.

A further belt webbing extension, preferably over plural revolutions of the belt reel, is obtained by the fact that the blocking ring has a thread and is mounted by said thread to a mating thread provided at the frame.

The thread can be a male thread, for instance, engaging in a fitting female thread at the frame of the seat belt retractor. In this way, the blocking ring can be screwed into an appropriately dimensioned aperture of the frame, for instance, whereby it is moreover safely supported on the frame.

In order to stop the belt reel after a defined rotation and thus to limit the belt webbing extension to a defined length, at or in the thread preferably a stop is provided for stopping the rotation of the blocking ring so that no additional stop mechanism is required. Upon rotating the belt reel the thread of the blocking ring is screwed into the complementary mating thread until the blocking ring contacts the stop.

The stop can be, for instance, a radially extending stop face. This can preferably be provided at the end of a thread so that the blocking ring is guided against said stop face upon screwing into the mating thread.

The stop can also be an axially projecting stop against which a corresponding counter-face of the blocking ring or of the frame is guided. The stop can be provided at a component part fixed to the frame or at the blocking ring.

In a preferred embodiment a holding ring is provided at the frame and the blocking ring is mounted at or in said holding ring, the latter including the mating thread. By exchanging the holding ring or by appropriately selecting a holding ring it is thus possible to adapt the seat belt retractor in a simple manner, for instance to a particular belt webbing extension length.

A detachable holding device can be provided between the blocking ring and the holding ring. Such detachable holding device is capable of fixing the blocking ring and the holding ring against each other so that only from a particular force, for instance, a twisting of the blocking ring relative to the holding ring and thus a belt webbing extension can be effectuated.

In an embodiment without a holding ring the detachable holding device can also be disposed between the blocking ring and the frame, however.

Preferably, the holding device is formed by a pin, especially a shear pin. The shear pin has a predetermined breaking point that breaks or is shorn off when a defined force is applied so that the blocking ring can be twisted against the holding ring or against the frame. This ensures that with low extending forces no belt webbing extension takes place but with appropriately higher extending forces, as they occur in the event of strong decelerations, for instance, a belt webbing extension can take place. The detachable holding device can thus be manufactured in a simple manner. No complicated control mechanism is necessary.

In order to decelerate the belt webbing extension a first force limiter can be functionally provided, for instance, between the blocking ring and the holding ring. Upon twisting the blocking ring against the holding ring, the latter absorbs the energy occurring upon belt webbing extension and thus decelerates the webbing extension.

The force limiter can be permanently connected, for example, so that no additional control is necessary. The particular design of the seat belt retractor permits a very flexible configuration of the range of rotation of the reel and thus of the belt webbing extension which can range from a very small rotation to plural revolutions of the belt reel.

The force limiter can also be selectable, however, so that in a normal state it is decoupled from the blocking ring and/or the holding ring and is coupled to the blocking ring and the holding ring only upon locking of the belt reel, for instance in the case of accident. The connection or disconnection can be effectuated in a path-controlled manner so that the force limiter is activated or deactivated after a defined belt webbing extension.

It is also possible that a second force limiter is functionally provided between the belt reel and the frame. This second force limiter can be disposed completely separately from the blocking ring and/or the holding ring so that it does not influence the latter. The second force limiter can be a conventional force limiter, for instance a torsion rod disposed inside the reel.

This second force limiter, too, can be permanently connected or can be selectable.

In order to be able to connect the second force limiter a lock wheel having a blocking teeth system is provided, for example. This lock wheel can be coupled to the second force limiter. A blocking pawl fixed to the frame can engage in the blocking teeth system of the lock wheel and thus block the lock wheel to the frame in a rotationally fixed fashion. In this way the second force limiter is completely independent of the blocking ring and/or the holding ring and in the non-activated state does not influence the blocking ring and/or the holding ring.

Preferably the second force limiter includes a control means for controlling the blocking pawl.

The control means can be coupled to the blocking ring, for instance, and can select the second force limiter upon rotation the blocking ring. Thus the second force limiter is connected only upon twisting of the blocking ring against the frame or the holding ring. In this way, the second force limiter can be controlled mechanically, for example, so that no electronic control is required.

The first force limiter and/or the second force limiter can have different known force limiters.

For instance, the first force limiter and/or the second force limiter can have a deformable member which is deformed while absorbing energy and thus decelerates the belt reel.

The deformable member can be a torsion rod, for instance. The latter can be arranged inside the belt reel so that a space-saving structure of the belt retractor is possible.

The first and/or second force limiter can also include a wire as well as a forming element, for instance, adapted to deform the wire. In this way also a force limitation over a longer belt webbing extension is possible, e.g. over plural revolutions of the belt reel.

For this purpose, the forming element has a baffle, for instance, through which the wire can be pulled. The wire is alternately bent by the baffle so that a resistive force is provided by the friction occurring and, with major deformations, by the deforming work.

It is also imaginable, however, that the first force limiter and/or the second force limiter includes a cutting force limiter, whereby better adaptation of the characteristic curve being possible, for instance.

But the first force limiter and/or the second force limiter also can have an electromagnetic force limiter.

Moreover, a hydraulic, especially a hydrodynamic, force limiter can be used.

DESCRIPTION OF THE EXAMPLE EMBODIMENTS

Figure 1:
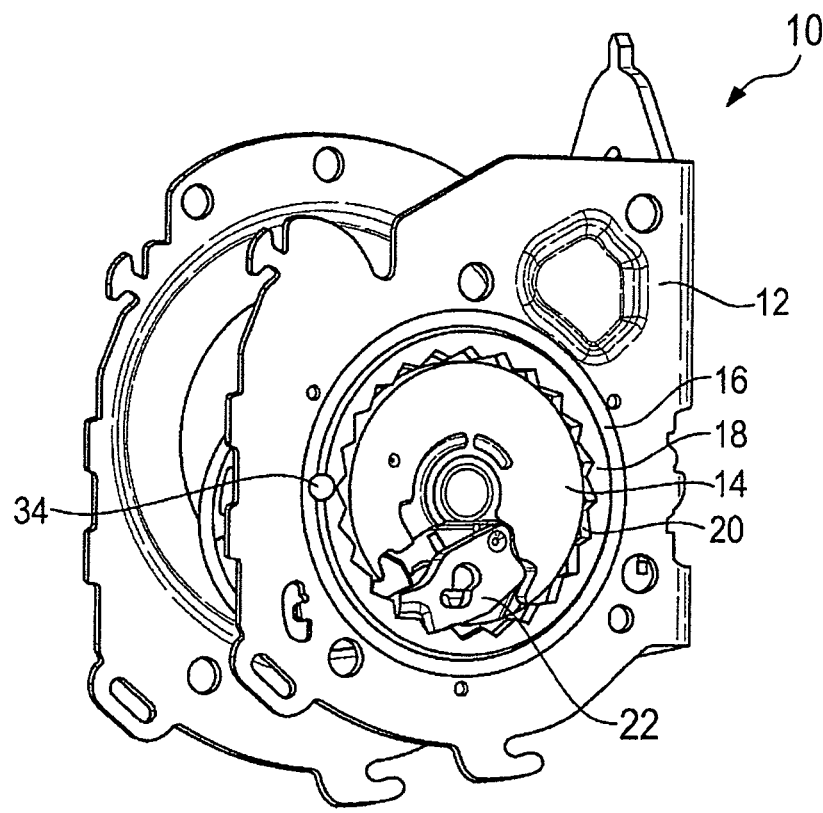
FIG. 1 shows a perspective view of a seat belt retractor according to the invention.

The seat belt retractor 10 illustrated in FIG. 1 includes a frame 12 in which a belt reel 14 is rotatably supported. At the frame 12 a holding ring 16 connected to the former in a rotatably fixed manner as well as a blocking ring 18 rotatably supported in the holding ring 16 are provided. The blocking ring 18 has a blocking teeth system 20 at its inside into which a blocking pawl 22 held at the belt reel 14 can engage.

Figure 2:
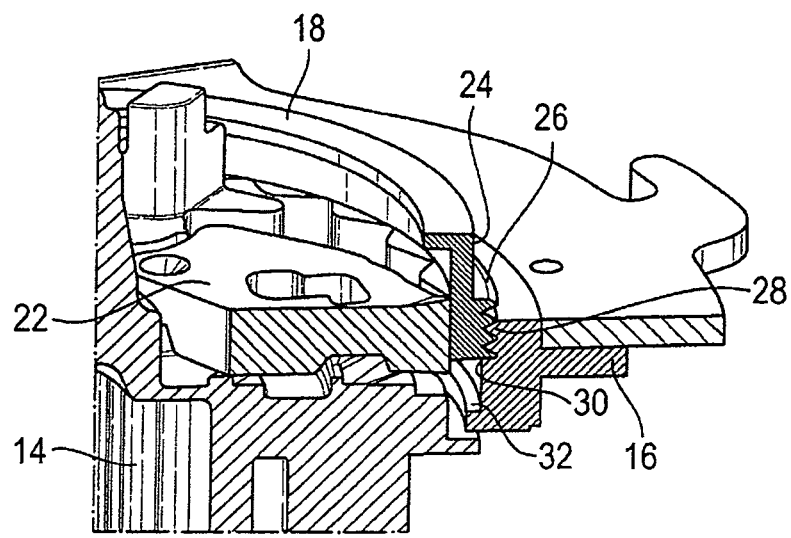
FIG. 2 shows the seat belt retractor of FIG. 1 in a detailed view.

As can be seen in FIG. 2, the blocking ring 18 has at its radial outside 24 a thread 26 in the form of a male thread with which the blocking ring 18 is mounted in a rotatably limited manner in a fitting mating thread 28 formed at the inside 30 of the holding ring 16. A stop 32 for stopping rotation of the blocking ring 18 against the holding ring 16 is formed at the holding ring 16.

Figure 3:
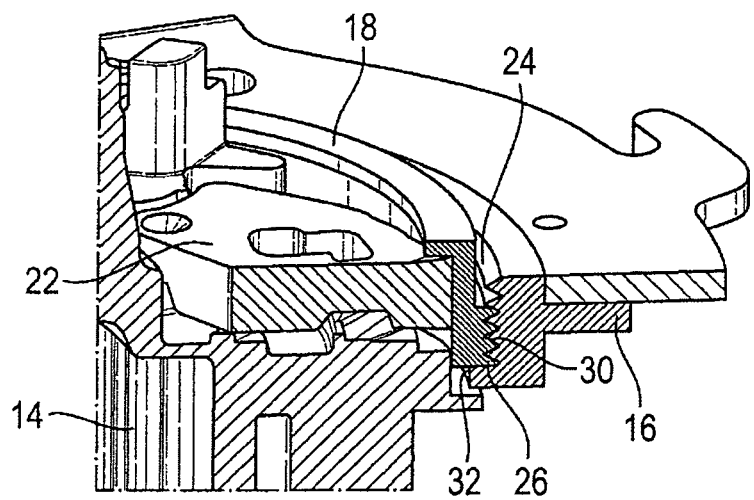
FIG. 3 shows a second detailed view of the seat belt retractor of FIG. 1.

The blocking pawl 22 radially outwardly engages in the blocking teeth system 20 so that the belt reel 14 is connected to the blocking ring 18 in a rotationally fixed fashion. If the belt reel 14 is connected to the blocking ring 18 in rotationally fixed manner, the blocking ring 18 is twisted against the holding ring 16 or the frame 12 when the belt webbing is extended. The blocking ring 18 is twisted against the holding ring 16 until the blocking ring 18 contacts the stop 32 of the holding ring 16 (cf. FIG. 3). The range of rotation of the belt reel 14 and thus the possible belt webbing extension length can be predetermined, for instance, by the distance of the blocking ring 18 from the stop 32 or by the pitch of the thread 26.

In FIG. 1 a detachable holding device 34 represented only schematically in this case is provided between the holding ring 16 and the blocking ring 18. Said detachable holding device 34 can exhibit a shear pin, for instance, which breaks or is shorn off only with a defined force so that the blocking ring 18 is twisted against the holding ring 16 or the frame 12 only when a defined extending force is applied. In the event of low extending forces, the blocking ring 18 is prevented from twisting against the holding ring 16 in this way.

The detachable holding device 34 can also be formed in another way. It is also imaginable that a control is provided which controls the detachable holding device 34. The detachable holding device 34 can also be arranged directly between the frame 12 and the blocking ring 18.

The blocking ring 18 can also be held directly at the frame 12 without a holding ring 16. The blocking ring 18 need not be held at the holding ring 16 or within the frame 12 by a thread 26, either. The blocking ring 18 can also be held rotatably at the frame 12 or at the holding ring 16 in any other manner. Nor is a stop 32 necessary. The rotation of the blocking ring 18 against the frame 12 can also be limited in any other way. In particular, the stop 32 need not be a radially extending stop face. For instance, it is also possible that the stop is axially projecting.

The blocking teeth system 20 need not be disposed at the inside of the blocking ring 18, either. The blocking pawl 22 can just as well be formed in any other way. The latter especially need not be designed such that it is capable of radially outwardly engaging in the blocking teeth system 20.

In order to slow down or decelerate the twisting of the belt reel 14 against the frame 12 or the holding ring 16, a first force limiter can be functionally arranged between the blocking ring 18 and the frame 12 or the holding ring 16. This first force limiter can be permanently connected, for instance, so that a force limitation is constantly effectuated as soon as the blocking ring 18 is coupled to the holding ring 16 or the frame 12 by the blocking pawl 22. But the first force limiter can also be designed to be selectable later.

Figure 4:
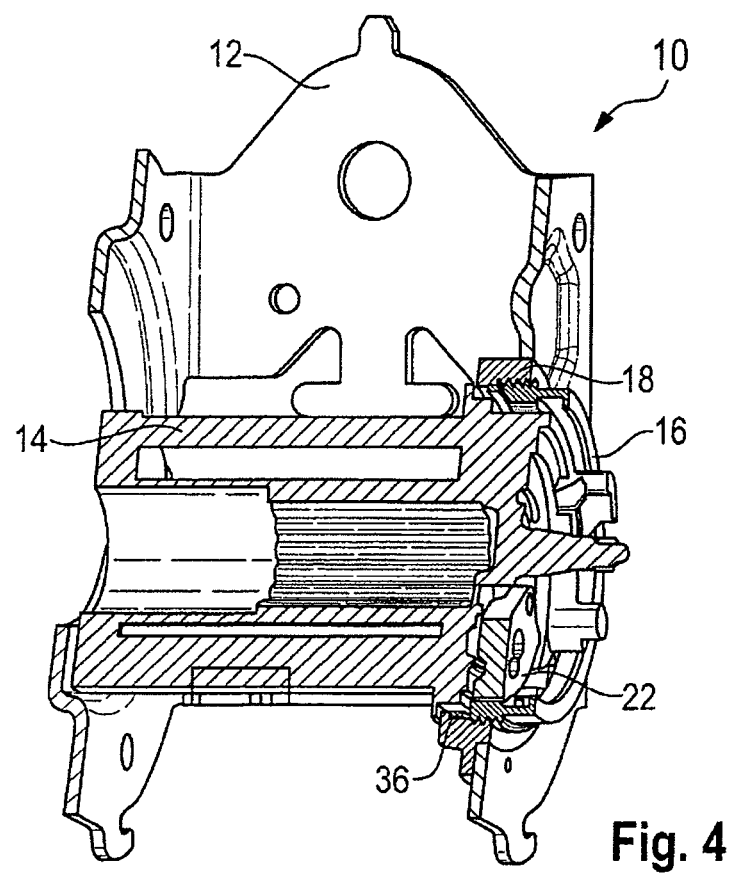
FIG. 4 shows the seat belt retractor of FIG. 1 in a second detailed view.
Figure 5:
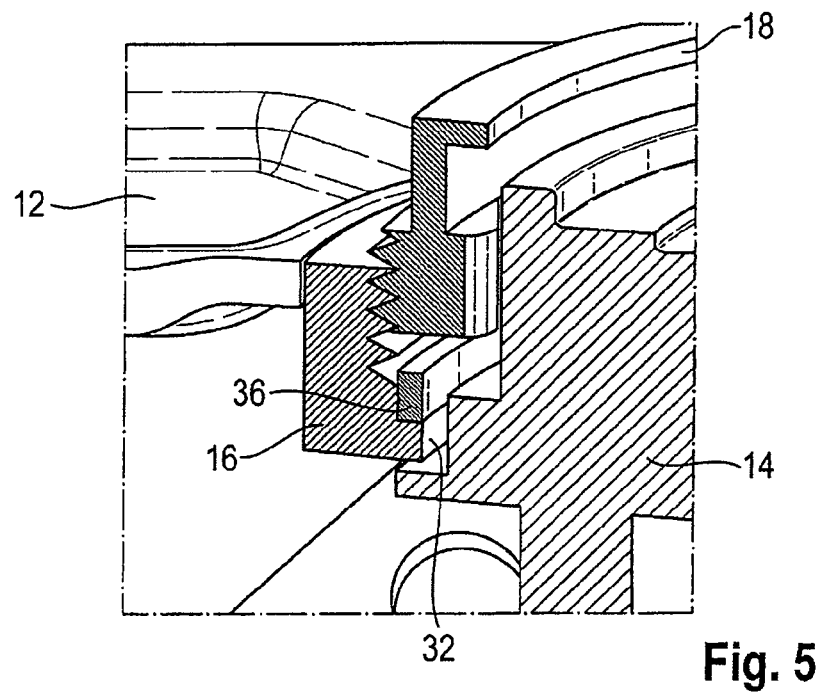
FIG. 5 shows a detailed view of the seat belt retractor of FIG. 4.

A first embodiment of such force limiter is illustrated in FIG. 4 and FIG. 5. In this case the force limiter is formed by a deformable member 36 which in the embodiment shown here has an annular design and is disposed at the stop 32 of the holding ring 16. When twisting the blocking ring 18 against the holding ring 16, the blocking ring 18 moves against the deformable member 36 and upsets the same. By the upsetting and the absorption of energy of the deformable member 36 a resistive force is provided so that the belt reel 14 and thus the belt webbing extension is decelerated.

Figure 6:
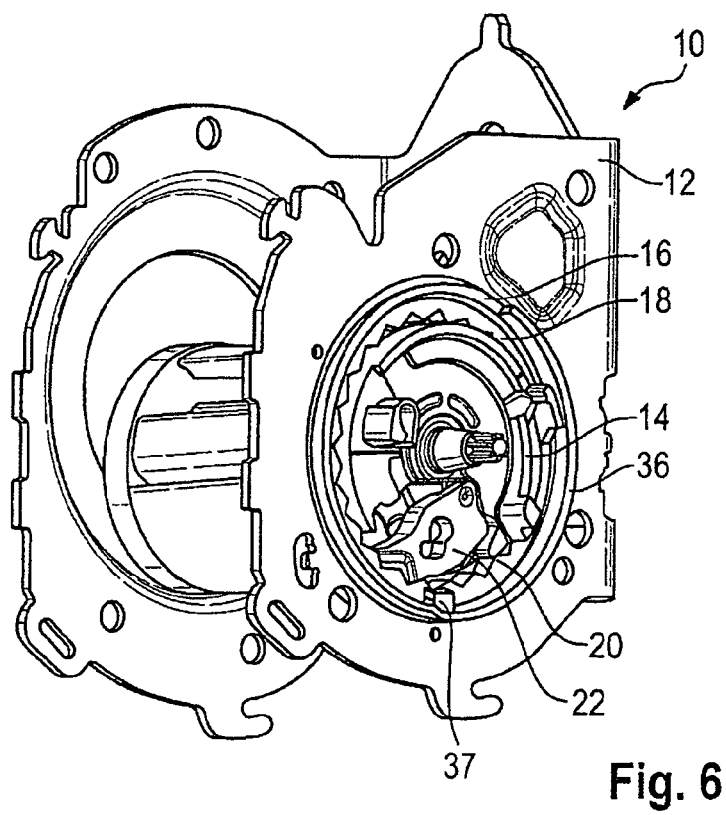
FIG. 6 shows a second embodiment of a seat belt retractor according to the invention.
Figure 7:
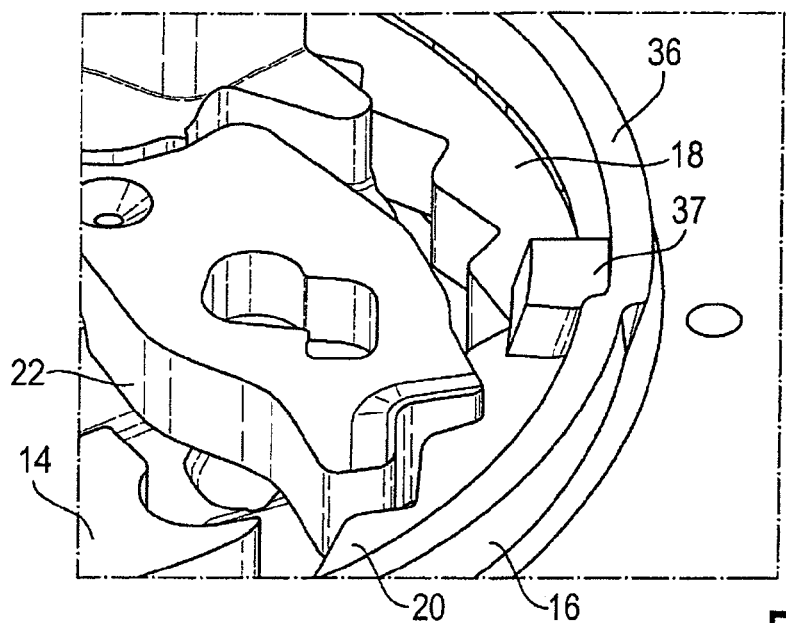
FIG. 7 shows a detailed view of the seat belt retractor of FIG. 6.

The deformable member 36 can also be a radial land being deformed by a projection 37 (FIGS. 6 and 7). The projection 37 is arranged at the blocking ring 18 in this case and urges the deformable member 36 disposed at the holding ring 16 radially outwardly.

However, the deformable member 36 can also have any other design. For example, the deformable member 36 can also be a torsion rod that is functionally arranged between the blocking ring 18 and the holding ring 16.

Figure 8:
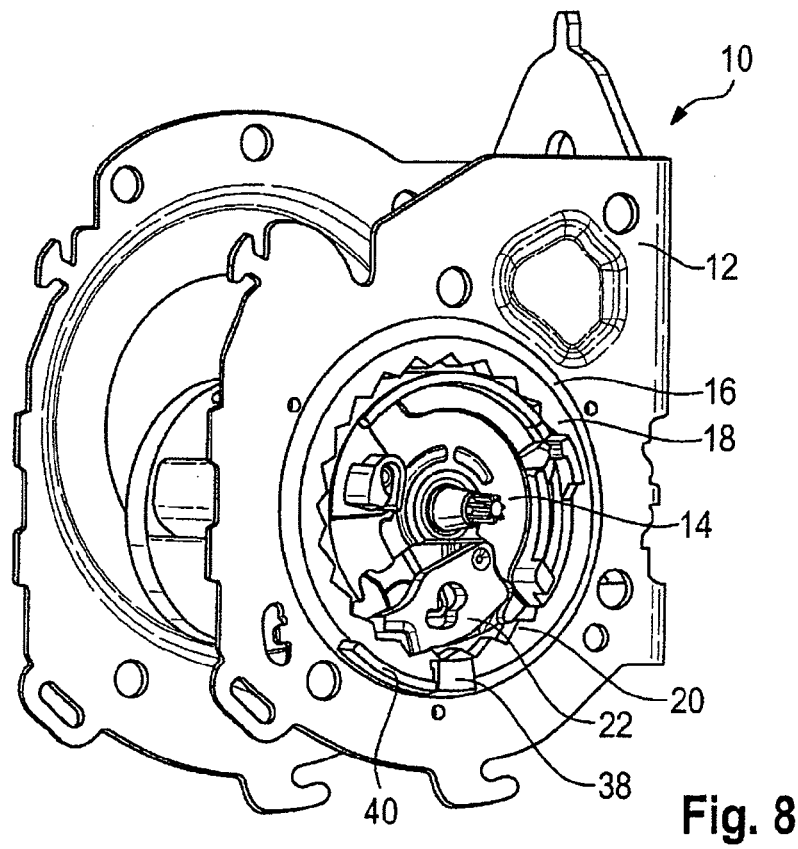
FIG. 8 shows a third embodiment of a seat belt retractor according to the invention.
Figure 9:
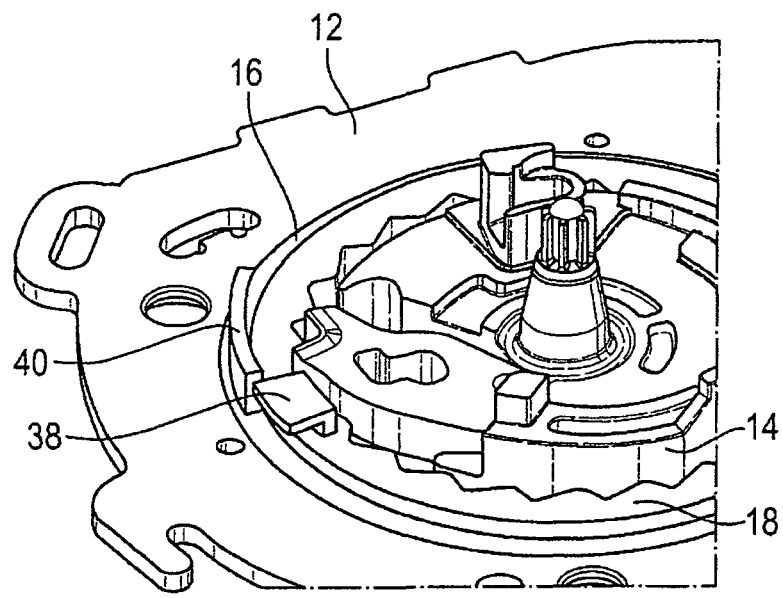
FIG. 9 shows a detailed view of the seat belt retractor of FIG. 8.

The force limitation of the first force limiter can also be effectuated by cutting or chip removal. In the embodiment illustrated in FIG. 8 and FIG. 9, for instance, a cutting insert 38 is disposed. The cutting insert 38 is held at the blocking ring 18 and cuts an annular land 40 provided at the holding ring 16 in this case. But the cutting insert could also be held at the holding ring 16 or at the frame 12. Equally, the land 40 can have any design. The distance between the blocking ring 18 and the holding ring 16 is continuously shortened by the thread 26 when the belt reel is twisted so that, when the cutting insert 38 is axially arranged, also cutting over plural revolutions of the belt reel 14 is possible.

Figure 10:
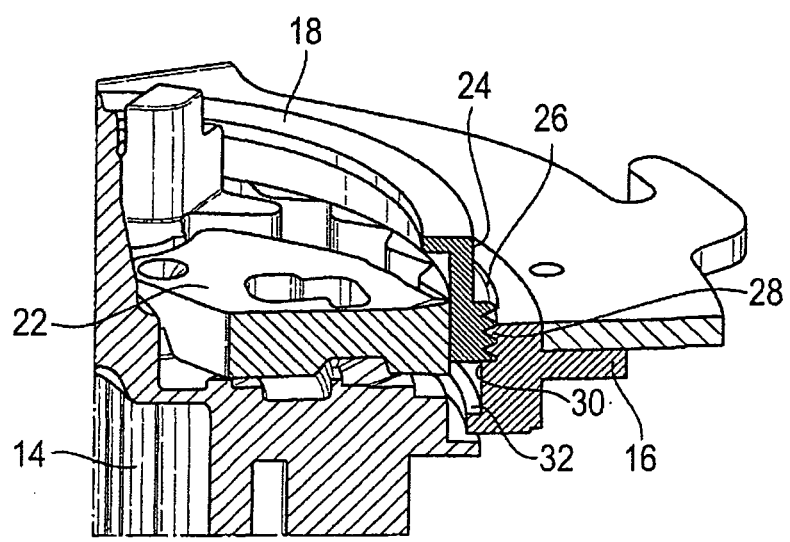
FIG. 10 shows a fourth embodiment of a seat belt retractor according to the invention.
Figure 11:
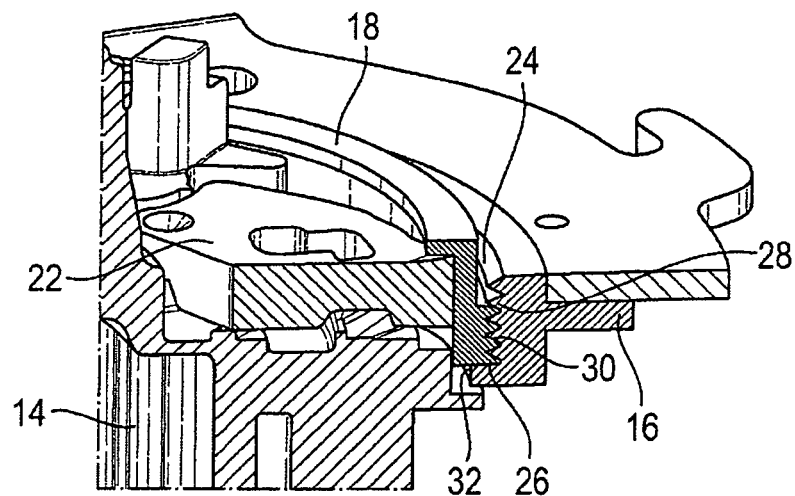
FIG. 11 shows a detailed view of the seat belt retractor of FIG. 10.

The absorption of energy can also be realized by a self-tapping thread, as is evident from FIG. 10 and FIG. 11. The mating thread 28 formed at the holding ring is only partly formed in this case so that the thread 26 of the blocking ring 18 cuts a thread into the holding ring 16 while absorbing energy when the blocking ring 18 is twisted against the holding ring 16, whereby a resistive force is provided.

Figure 12:
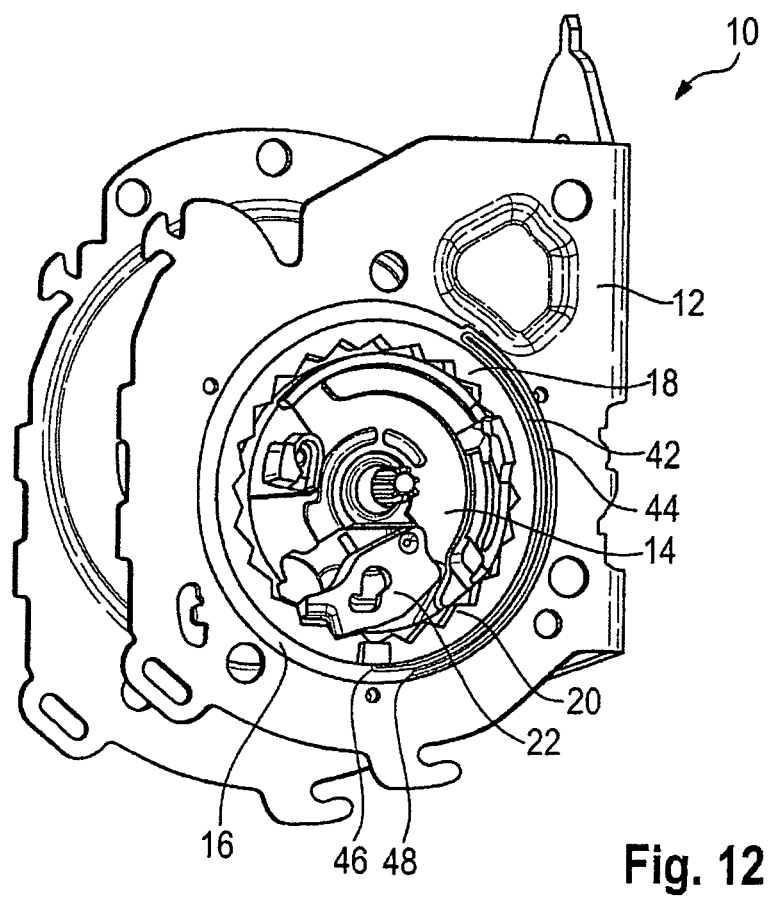
FIG. 12 shows a fifth embodiment of a seat belt retractor according to the invention.
Figure 13:
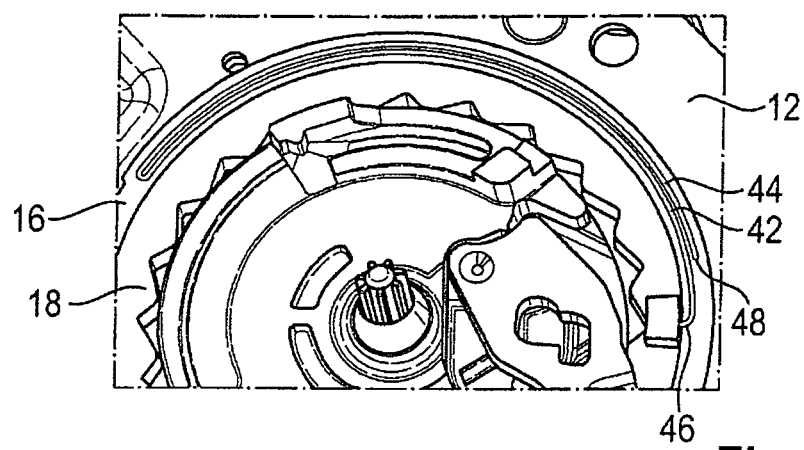
FIG. 13 shows a detailed view of the seat belt retractor of FIG. 12.

The first force limiter also may include a wire 42 which is deformed by a forming element 44. In the embodiment shown in FIG. 12 and FIG. 13 the wire 42 is held by one end 46 at the blocking ring 18 and by the other end 48 at the holding ring 16. The wire 42 in this case is arranged in double layer in a groove formed between the holding ring 16 and the blocking ring 18 which forms the forming element 44. Upon twisting of the blocking ring 18 against the holding ring 16 the wire 42 is extended and bent at the respective vertex. In this way force limitation takes place until the wire 42 is completely stretched. The range of rotation of the belt reel 14 can be limited by a stop, for instance in order to prevent a complete stretching of the wire 42.

Figure 14:
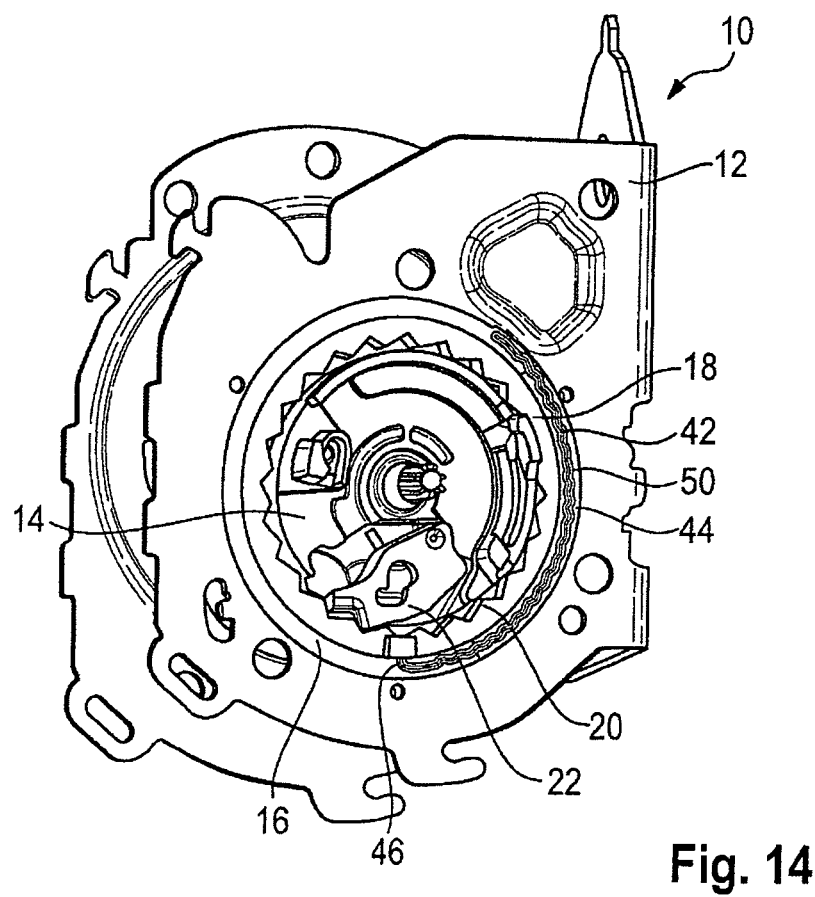
FIG. 14 shows a sixth embodiment of the seat belt retractor according to the invention.
Figure 15:
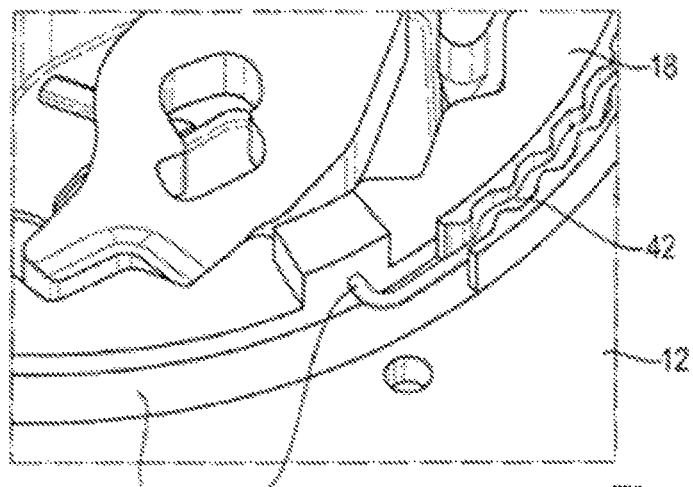
FIG. 15 shows a detailed view of the seat belt retractor of FIG. 14.

The wire 42 can also be formed to be single-layer only and exclusively be held at the blocking ring 18 (FIGS. 14 and 15).

The forming element 44 in this embodiment has a baffle 50 that deforms the wire 42 during extension in an alternating fashion in both directions.

Deviating from the embodiments shown so far, also a second force limiter can be arranged directly between the belt reel 14 and the frame 12. This second force limiter can be arranged in parallel to the first force limiter, but the second force limiter can also be exclusively provided between the belt reel 14 and the frame 12.

Figure 16:
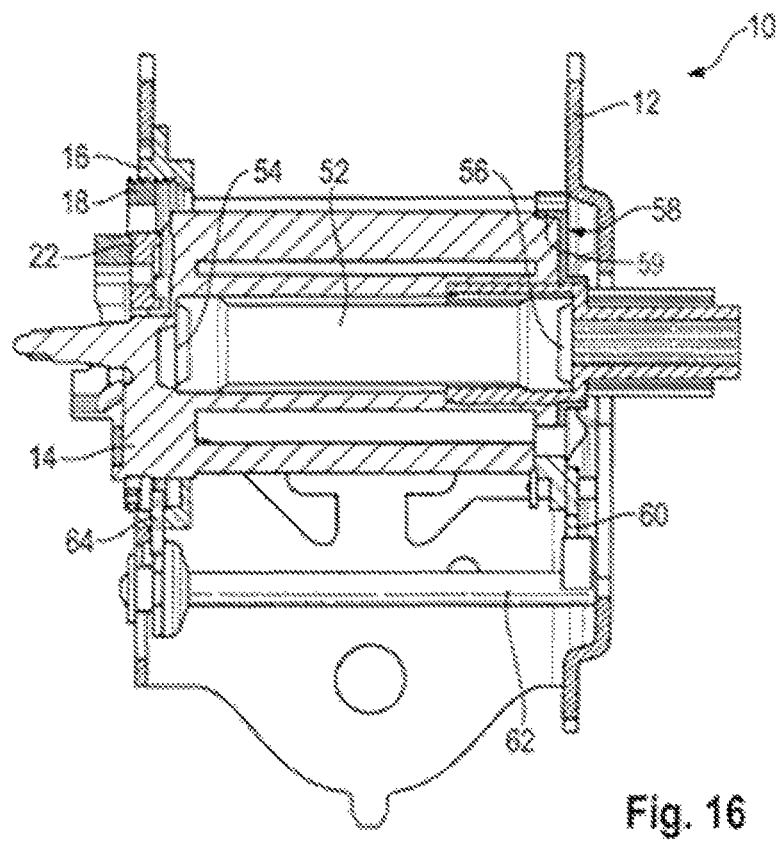
FIG. 16 shows a seventh embodiment of the seat belt retractor according to the invention.

In the embodiment shown in FIG. 16 the second force limiter includes a torsion rod 52 which is fastened in a rotationally fixed manner by an end 54 on the left with respect to FIG. 16 to the belt reel 14 and is held in a rotationally fixed manner by its right end 56 at a lock wheel 58. The lock wheel 58 can be fixed at the frame 12 in a rotationally fixed fashion by a blocking pawl 60 fixedly mounted to the frame which engages in a blocking teeth system 59 at the inside of the lock wheel 58.

The blocking pawl 60 is operated in this case by an actor rod 62 coupled to the blocking ring 18 via an actuator 64. Upon rotation of the blocking ring 18 the actuator 64 is moved so that the actor rod 62 operates the blocking pawl 60 and activates the second force limiter. Thus the second force limiter is activated automatically upon twisting the blocking ring 18 against the holding ring 16 and the frame 12, respectively. An electronic control is not necessary in this case.

The control of the second force limiter can also be performed, just as a manual selection of the first force limiter, in any other way. It is also imaginable that an electronic control is provided for connecting the first and/or the second force limiter.

Equally the first and/or the second force limiter can be constituted by another known force limiting element. For instance, the force can also be limited electromagnetically or hydraulically.

The invention claimed is:

1. A seat belt retractor (10) comprising a frame (12), a belt reel (14) rotatably mounted in the frame (12) and a blocking pawl (22) provided at the belt reel (14) which is capable of engaging in a blocking teeth system (20), wherein the blocking teeth system (20) is provided at a blocking ring (18), and wherein the blocking ring (18) includes a thread (26) that threadably engages a mating thread (28) provided at the frame (12) to rotatably attach the blocking ring (18) to the frame (12), the blocking teeth system being radially aligned with the thread.

2. The seat belt retractor according to claim 1, wherein the blocking teeth system (20) is provided at an inside (32) of the blocking ring (18) and the blocking pawl (22) is capable of engaging radially outwardly in the blocking teeth system (20).

3. The seat belt retractor according to claim 2, wherein a holding ring (16) is provided at the frame (12) and the blocking ring (18) is mounted at or in said holding ring (16), wherein the holding ring (16) includes the mating thread (28).

4. The seat belt retractor according to claim 3, wherein a detachable holding device (33) is provided between the blocking ring (18) and the holding ring (16).

5. The seat belt retractor according claim 4, wherein a first force limiter is functionally provided between the blocking ring (18) and the holding ring (16).

6. The seat belt retractor according to claim 5, wherein the first force limiter is permanently connected.

7. The seat belt retractor according to claim 5, wherein the first force limiter is selectable.

8. The seat belt retractor according to claim 5, wherein the first force limiter and/or the second force limiter has a deformable member (36).

9. The seat belt retractor according to claim 8, wherein the deformable member (36) is a torsion rod (52).

10. The seat belt retractor according to claim 5, wherein the first force limiter and/or the second force limiter includes a wire (42) as well as a forming element (44) capable of deforming the wire (42).

11. The seat belt retractor according to claim 10, wherein the forming element (44) includes a baffle (50) through which the wire (42) can be pulled.

12. The seat belt retractor according to claim 5, wherein the first force limiter and/or the second force limiter includes a cutting force limiter (38).

13. The seat belt retractor according to claim 5, wherein the first force limiter and/or the second force limiter includes an electromagnetic force limiter.

14. The seat belt retractor according to claim 5, wherein that the first force limiter and/or the second force limiter includes a hydraulic, especially a hydrodynamic force limiter.

15. The seat belt retractor according to claim 4, wherein the detachable holding device (33) is formed by a pin, especially a shear pin.

16. The seat belt retractor according to claim 2, wherein a stop (34) capable of stopping the rotation of the blocking ring (18) is provided at or in the thread (26).

17. The seat belt retractor according to claim 16, wherein the stop (34) is a radially extending stop face.

18. The seat belt retractor according to claim 16, wherein the stop (34) is an axially projecting stop.

19. The seat belt retractor according to claim 2, wherein the thread (26) is a male thread.

20. The seat belt retractor according to claim 1, wherein a second force limiter is functionally provided between the belt reel (14) and the frame (12).

21. The seat belt retractor according to claim 20, wherein the second force limiter is selectable.

22. The seat belt retractor according to claim 21, wherein a lock wheel (58) of a blocking teeth system (59) is provided which is adapted to be coupled to the second force limiter, wherein a blocking pawl (60) fixed to the frame is capable of engaging in the blocking teeth system (59) and of locking the blocking wheel (58) at the frame in a rotationally fixed manner.

23. The seat belt retractor according to claim 22, wherein the second force limiter includes a control means for controlling the blocking pawl (60).

24. The seat belt retractor according to claim 23, wherein the control means is coupled to the blocking ring (18) and upon rotation of the blocking ring (18) connects the second force limiter.

25. The seat belt retractor according to claim 20, wherein the second force limiter is permanently connected.

26. The seat belt retractor according to claim 1, wherein a detachable holding device (33) is provided between the blocking ring (18) and the frame (12).

* * * * *